United States Patent [19]

Kaiser et al.

[11] 4,021,177

[45] May 3, 1977

[54] APPARATUS FOR FORMING RAISED MARKS ON PLASTIC CABLE JACKETS

[75] Inventors: Hans Kaiser, Ditzingen; Ernst Konnerth, Stuttgart, both of Germany

[73] Assignee: International Standard Electric Corporation, New York, N.Y.

[22] Filed: Aug. 18, 1975

[21] Appl. No.: 605,785

[52] U.S. Cl. .......................... 425/324 R; 425/811; 101/37

[51] Int. Cl.[2] .......................... B29F 5/02

[58] Field of Search .................. 425/324, DIG. 811; 101/37, 76, 77

[56] References Cited

UNITED STATES PATENTS

| | | | |
|---|---|---|---|
| 1,845,726 | 2/1932 | Scott | 101/37 |
| 2,867,001 | 1/1959 | Lewis et al. | 425/324 X |
| 3,709,143 | 1/1973 | Rundell | 101/37 |
| 3,788,213 | 1/1974 | Brown et al. | 101/37 |

FOREIGN PATENTS OR APPLICATIONS

| | | | |
|---|---|---|---|
| 45-27384 | 5/1966 | Japan | 425/324 |
| 1,257,769 | 12/1971 | United Kingdom | |

*Primary Examiner*—Richard B. Lazarus

*Attorney, Agent, or Firm*—John T. O'Halloran; Alfred C. Hill

[57] ABSTRACT

The apparatus consists of a drum whose circumferential surface coming in contact with the cable surface is provided with grooves corresponding to the marks to be formed. With each turn of the drum, the grooves are filled with colored plastic powder which, when coming in contact with the hot cable jacket, is sintered into the mark and fuses with cable jacket.

2 Claims, 4 Drawing Figures

APPARATUS FOR FORMING RAISED MARKS ON PLASTIC CABLE JACKETS

BACKGROUND OF THE INVENTION

The present application relates to an apparatus for continuously forming raised marks on plastic cable jackets which is disposed in the immediate vicinity of the screw extruder producing the cable jacket.

Because of the ever increasing number of different cables laid together in cable ditches or cable chutes it is necessary to provide these cables with marks for easier identification. These marks, e.g. marks of the owner or manufacturer, but also length or generic marks such as marks for telephone or power cables, should clearly stand out against the cable jacket even when viewed from a distance or in badly lighted cable ducts, and should be abrasion-resistant. They should be clearly visible not only on new cables but also on cables which had been in use for a protracted period of time, e.g., buried in the ground.

It is known in the art to obtain such marks by embossing the cable jacket while it is still soft immediately after its production. It is obvious that, because of the cable jacket being mostly made of black or dark plastic, the embossed marks contrast badly with their background and, therefore, are badly visible. To this must be added that, in order for the marks to be visible at all, very heavy embossing is necessary which, however, results in the cable jacket being deformed and its thickness being reduced. To offset these disadvantages, the cable jacket would have to be overly thick, which, however, would have great economic disadvantages because of the considerably higher material expenditure.

A method and an apparatus are known (German Published Application No. 1,951,597) which avoid the aforementioned disadvantages. In the known method, powder of a material equal or similar to that of the cable jacket is applied onto the hot cable jacket through a stencil provided with apertures in accordance with the marks to be formed. Through the residual heat of the cable jacket, the powder is then sintered on the spot into a raised mark which simultaneously fuses with the cable jacket.

The known method and the known apparatus have proved suitable in practice. However, they can only be used to form areal marks such as generic marks, firm-symbols or the like, but do not permit continuous length marks to be applied onto the cable jacket in equal quality and with justifiable expense.

SUMMARY OF THE INVENTION

It is the object of the present invention to improve the known apparatus for continuously forming raised marks on plastic cable jackets and to develop it in such a manner that is also permits the formation of continuous length marks. The improvement of the novel apparatus is to lie in particular to a simplification of the apparatus for use in production without the quality of the marks formed being lowered in any way.

The invention is characterized in that on at least one side of the cable emerging from the screw extruder a rotatable drum is disposed whose circumferential surface coming in contact with the cable surface is provided at regular intervals with the marks or depressions corresponding to the outlines of the marks and to which a container is fixedly attached which contains colored plastic powder and whose outlet rests on the surface of the drum in the area of the marks.

BRIEF DESCRIPTION OF THE DRAWING

Further advantageous details of the invention will be apparent and will now be explained in more detail with reference to the accompanying drawings, in which.

DESCRIPTION OF THE PREFERRED EMBODIMENT

Figure 1:
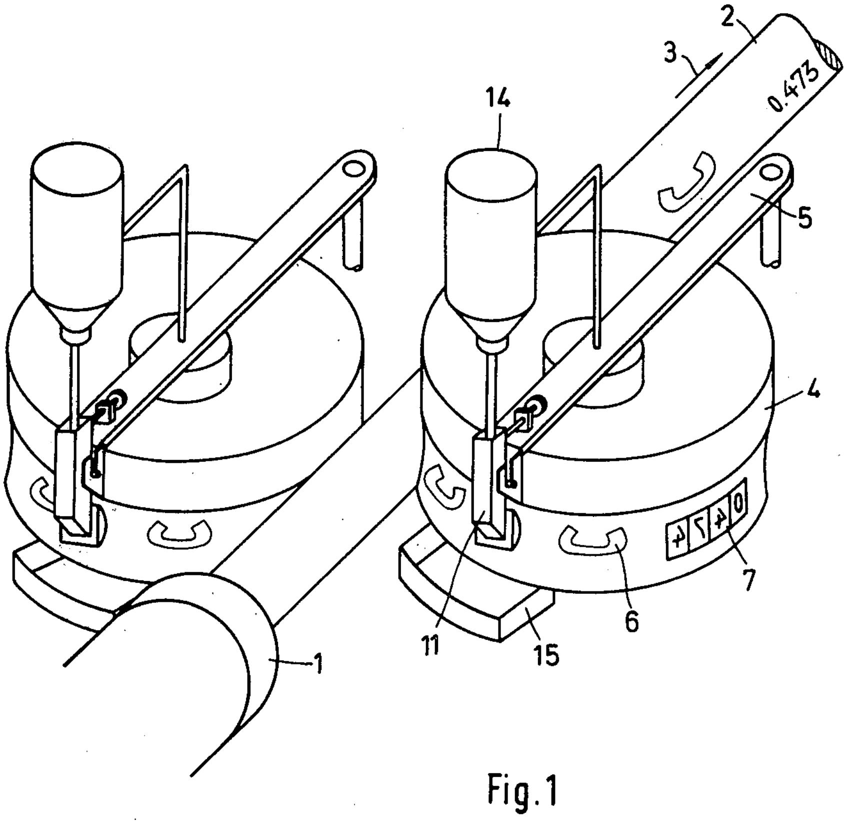
FIG. 1 is a perspective view of two of the novel apparatuses for forming raised marks, which are positioned on both sides of a plastic cable jacket.

In FIG. 1 the reference numeral 1 designates the screw extruder head which applies the cable jacket onto the cable core. Having left the screw extruder, the cable 2, provided with the cable jacket, is pulled off in the direction of arrow 3. Immediately behind the extruder heat, i.e, where the just applied plastic cable jacket is still soft, one of the novel apparatuses for forming the raised marks is disposed on both sides of the cable in contacting relationship with the cable surface.

The apparatus consists of the drum 4, which is rotatably attached to the holder 5. Since the drum 4 touches, or is forced against, the pulled-off cable 2, it is taken along by the cable and set rotating. The drum's circumferential surface contacting the cable is provided, at regular intervals, with the marks to be formed on the cable jacket. If the marks are areal marks as in the case of the stylized telephone receiver 6 (generic mark for telephone cables), a depression (groove) will be provided in the drum's surface in accordance with the outlines of the mark. If the mark is a letter or a number of the counting mechanism 7 incorporated in the drum, the depression will be an image of the mark itself.

Figure 3A:
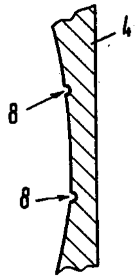
FIG. 3*a* is an enlarged section through the drum wall where a mark is provided as a depression.
Figure 3B:
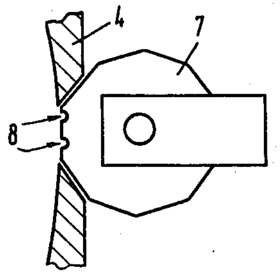
FIG. 3*b* is an enlarged section through the drum wall where the counting mechanism is provided.

For a better understanding, an enlarged section through the wall of the drum at the point where the grooves 8 corresponding to the outlines of the mark or to the mark itself are provided is shown in FIG. 3*a*. Similar provisions are made at the point where, insted of an invariable mark, one or more variable marks such as the digits of an automatically advancing counting mechanism are provided. FIG. 3*b* is a schematic view of such a counting mechanism 7 which is so placed into the aperture of the drum wall that the digits and the circumferential surface of the drum form one plane. In this case, the grooves 8 corresponding to the digits are sunk in the counting wheels of the counting mechanism.

Figure 2:
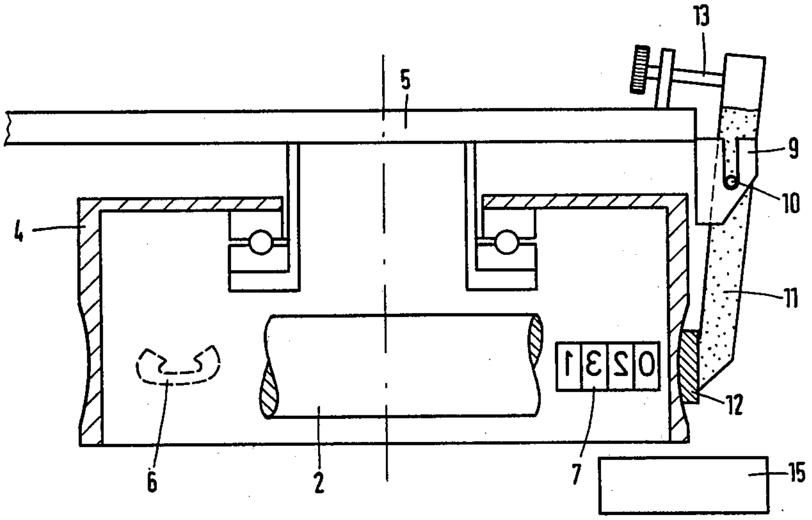
FIG. 2 is a longitudinal section through the novel apparatus.

As can be best seen from FIG. 2, two holding plates 9 provided with a vertical slot are attached to the end of the holder 5. Between these holding plates the tubular container 11 of rectangular section, which is filled with plastic powder, is so pivoted by means of pins 10 as to be capable of swivelling through a small angle. At its lower end the container 11 is angled so that its outlet is directed to the drum's circumferential surface provided with the marks. The outlet is provided with a ring packing 12, e.g., of felt. The screw 13, which is supported by the holder 5 and has a knurled head, exerts force on the upper end of the container 11 so that the outlet is tightly and self-sealingly pressed against the circumferential surface of the drum.

As can be seen in FIG. 1, the storage hopper 14, which is filled with plastic powder and from which the container 11 is refilled automatically, is mounted above the upper opening of the container 11. A collecting vessel 15 for receiving excessive powder is disposed below the container 11. The novel apparatus operates as follows. As mentioned above, the pulled-off cable 2 causes the drum 4 to rotate. Thus, the circumferential surface provided with the marks is continuously moved past the plastic-powder column standing in the outlet of the container. As the marks slide along the outlet, their grooves are filled with plastic powder. As soon as the grooves filled with plastic powder come into contact with the soft and still hot plastic cable jacket (in the case of the arrangement of FIG. 1 after one quarter turn of the drum 4), the powder in the groove is sintered and simultaneously fuses with the cable jacket.

In this way, sharp-edges and - if a suitable plastic powder is used - deeply contrasting marks are formed on the cable jacket. The novel apparatus can also be used to continuously provide the cable jacket with length marks indicating its effective length. If the cable jacket is to be provided with length marks at intervals of one meter, it is only necessary to use a drum with a circumference of one meter and a counting mechanism advancing one digit with each turn of the drum.

While we have described above the principles of our invention in connection with specific apparatus it is to be clearly understood that this description is made only by way of example and not as a limitation to the scope of the invention as set forth in the objects thereof and in the accompanying claims.

We claim:

1. An apparatus for forming raised marks in a hot plastic cable jacket along the length thereof comprising:

a screw extruder producing at an output thereof said hot cable jacket;

a holder disposed adjacent and above said output of said screw extruder and on at least one side of said hot cable jacket;

a drum rotatably attached adjacent the center of said holder, said drum being positioned adjacent said output of said screw extruder and on at least one side of said hot cable jacket emerging from and moving away from said output of said screw extruder as said hot cable jacket is pulsed from said output of said screw extruder, said drum being attached to said holder to have a circumferential surface of said drum in contact with the surface of said hot cable jacket, said circumferential surface of said drum being provided at regular intervals with grooves corresponding to the outlines of said raised marks, said drum being rotated by said moving hot cable jacket due to said contact between the surface of said hot cable jacket and said circumferential surface of said drum, said groove forming said raised marks in said hot cable jacket along the length thereof as said drum is rotated; and a container means having an outlet with the end of said container means opposite said outlet thereof pivotably secure to one end of said holder and said outlet of said container means resting on said circumferential surface of said drum in the area of said grooves, said container means containing colored plastic powder discharged at said container means output into said grooves to enable simultaneous forming of said raised marks by said grooves and coating said raised marks by said grooves with said plastic powder which, when coming into contact with said hot cable jacket, is sintered into said raised marks formed by said grooves and fuses with said hot cable jacket to provide said raised marks with a predetermined color; said container means including a tube having an outlet, said tube being angled with respect to said drum; and a felt packing ring coupled to said tube adjacent said outlet of said tube, said tube being pivoted toward said circumferential surface of said drum to force said oulet of said tube and said ring against said circumferential surface of said drum in the area of said grooves to ensure that said powder is discharged into only said grooves.

2. An apparatus according to claim 1, wherein said grooves are provided by a counting mechanism having grooved numerals, said counting mechanism automatically advancing with each turn of said drum to provide different numerals as said marks along the length of said cable jacket.

* * * * *